US012371763B2

(12) United States Patent
Takagi et al.

(10) Patent No.: US 12,371,763 B2
(45) Date of Patent: Jul. 29, 2025

(54) Sm—Fe—N-BASED MAGNET POWDER, Sm—Fe—N-BASED SINTERED MAGNET, AND PRODUCTION METHOD THEREFOR

(71) Applicants: NATIONAL INSTITUTE OF ADVANCED INDUSTRIAL SCIENCE AND TECHNOLOGY, Tokyo (JP); Murata Manufacturing Co., Ltd., Nagaokakyo (JP)

(72) Inventors: Kenta Takagi, Nagoya (JP); Wataru Yamaguchi, Nagoya (JP); Takaaki Yokoyama, Nagaokakyo (JP); Ryoichi Yamagata, Nagaokakyo (JP); Yosuke Sato, Nagaokakyo (JP)

(73) Assignees: NATIONAL INSTITUTE OF ADVANCED INDUSTRIAL SCIENCE AND TECHNOLOGY, Tokyo (JP); MURATA MANUFACTURING CO., LTD., Nagaokakyo (JP)

( * ) Notice: Subject to any disclaimer, the term of this patent is extended or adjusted under 35 U.S.C. 154(b) by 779 days.

(21) Appl. No.: 17/489,054

(22) Filed: Sep. 29, 2021

(65) Prior Publication Data

US 2022/0037065 A1 Feb. 3, 2022

Related U.S. Application Data

(63) Continuation of application No. PCT/JP2020/013947, filed on Mar. 27, 2020.

(30) Foreign Application Priority Data

Apr. 5, 2019 (JP) ................................ 2019-072903

(51) Int. Cl.
*C22C 33/02* (2006.01)
*B22F 1/052* (2022.01)
(Continued)

(52) U.S. Cl.
CPC .......... *C22C 33/0278* (2013.01); *B22F 1/052* (2022.01); *B22F 3/1017* (2013.01); *H01F 1/059* (2013.01); *H01F 41/0246* (2013.01)

(58) Field of Classification Search
None
See application file for complete search history.

(56) References Cited

U.S. PATENT DOCUMENTS

2016/0314882 A1* 10/2016 Kim ........................ H01F 1/086
2019/0333661 A1 10/2019 Takagi et al.

FOREIGN PATENT DOCUMENTS

JP 2004303881 A 10/2004
JP 2015005550 A 1/2015
(Continued)

OTHER PUBLICATIONS

Machine Translation of JP-2017055072-A (Year: 2017).*
(Continued)

*Primary Examiner* — Keith Walker
(74) *Attorney, Agent, or Firm* — ArentFox Schiff LLP

(57) ABSTRACT

A Sm—Fe—N-based magnet powder that includes a Sm—Fe—N-based magnetic material powder, wherein an average particle size of the Sm—Fe—N-based magnetic material powder is not larger than 5 μm, and a full width at half maximum of a diffraction peak of a (220) plane in an X-ray diffraction profile of the Sm—Fe—N-based magnetic material powder is not larger than 0.0033 Å. Also disclosed is a Sm—Fe—N-based sintered magnet that includes a sintered body of a Sm—Fe—N-based magnetic material, wherein an average grain size of crystal grains of the Sm—Fe—N-based magnetic material is not larger than 5 μm, and a full width at half maximum of a diffraction peak of a (220) plane in an X-ray diffraction profile of the Sm—Fe—N-based magnetic material is not larger than 0.0033 Å.

16 Claims, 7 Drawing Sheets

(51) Int. Cl.

| | |
|---|---|
| ***B22F 3/10*** | (2006.01) |
| ***H01F 1/059*** | (2006.01) |
| ***H01F 41/02*** | (2006.01) |

(56) References Cited

FOREIGN PATENT DOCUMENTS

| | | | | |
|---|---|---|---|---|
| JP | 2017055072 | A | * | 3/2017 |
| JP | 2017203200 | A | * | 11/2017 |
| WO | 2015199096 | A1 | | 12/2015 |
| WO | 2018163967 | A1 | | 9/2018 |

OTHER PUBLICATIONS

Machine Translation of JP-2017203200-A (Year: 2017).*
Written Opinion of the International Searching Authority issued for PCT/JP2020/013947, date of mailing Jun. 23, 2020.
International Search Report issued for PCT/JP2020/013947, date of mailing Jun. 23, 2020.

* cited by examiner

Sm—Fe—N-BASED MAGNET POWDER, Sm—Fe—N-BASED SINTERED MAGNET, AND PRODUCTION METHOD THEREFOR

CROSS REFERENCE TO RELATED APPLICATIONS

The present application is a continuation of International application No. PCT/JP2020/013947, filed Mar. 27, 2020, which claims priority to Japanese Patent Application No. 2019-072903, filed Apr. 5, 2019, the entire contents of each of which are incorporated herein by reference.

FIELD OF THE INVENTION

The present invention relates to a Sm—Fe—N-based magnet powder, a Sm—Fe—N-based sintered magnet, and a production method therefor.

BACKGROUND OF THE INVENTION

A Sm—Fe—N-based magnet is representative of a rare earth-transition metal-nitrogen-based magnet, and has a high anisotropic magnetic field and saturation magnetization. The Sm—Fe—N-based magnet has a Curie temperature relatively higher than that of other rare earth-transition metal-nitrogen-based magnets, whereby the Sm—Fe—N-based magnet has excellent heat resistance. For this reason, the Sm—Fe—N-based magnet is an excellent magnetic material.

As a raw material of a Sm—Fe—N-based magnet, a Sm—Fe—N-based magnet powder has been used. Heretofore, it has been supposed that the smaller the particle size of the Sm—Fe—N-based magnet powder as the raw material, the higher the coercivity. Thus, the Sm—Fe—N-based magnet powder is pulverized into small pieces.

For example, Patent Literature 1 describes that a Sm—Fe—N-based magnet coarse powder is pulverized into 10 μm or less by using a dry-type jet mill or a wet-type bead mill to prepare a Sm—Fe—N-based magnet fine powder as the raw material. Then, the Sm—Fe—N-based magnet fine powder is compacted under a molding surface pressure of 1 to 5 GPa at a temperature of 600° C. or less to produce a bulk Sm—Fe—N-based magnet of a relative density of 80% or more.

Further, for example, Patent Literature 2 describes a method for producing a Sm—Fe—N-based magnet powder characterized in that a Sm—Fe-based alloy powder is finely pulverized to have an average particle size of 5 μm or less, the fine powder is pre-molded under a molding pressure of 1 ton/cm$^2$ or less, and then, the molded article is subjected to a heat treatment at 550 to 850° C. in an inert gas atmosphere and to a nitriding treatment at 350 to 600° C., and the resulting nitriding treated molded article is crushed to have an average particle size of 5 μm or less.

Patent Literature 1: WO 2015/199096 A1

Patent Literature 2: JP 2004-303881 A

Patent Literature 3: JP 2017-055072 A

SUMMARY OF THE INVENTION

A Sm—Fe—N-based sintered magnet is obtainable by sintering a Sm—Fe—N-based magnet powder. As a result of the present inventor's research, it has been discovered that when a Sm—Fe—N-based magnet coarse powder is just pulverized for the purpose of obtaining a high coercivity in the Sm—Fe—N-based sintered magnet, it causes a problem of decreasing the saturation magnetization. The reason why the decrease in saturation magnetization is caused is believed to be because the impact during pulverization may cause lattice strain, and thereby a crystallinity is lowered.

In Patent Literature 1, the crystallinity of the fine powder and the bulk Sm—Fe—N-based magnet is neither understood nor controlled, and the crystallinity is considered to be lowered. Although Patent Literature 1 does not mention any specific value of saturation magnetization, it is assumed from the value of remanent magnetization that the saturation magnetization is also lowered.

In Patent Literature 2, the pulverized powder is subjected to a heat treatment in order to remove pulverization strain, in other words, to improve the crystallinity which is lowered by pulverization. As described in Patent Literature 3, however, when the oxidized material is heated, a reaction between an oxidized phase and a magnet phase would cause a notable decrease in coercivity. It is impossible to avoid such phenomenon by excluding oxygen at a time point of adding an amount of heat, if a surface oxide film has already formed by the previous steps. In Patent Literature 2, measures for preventing oxidation at the step of heat treatment, such as preliminary molding, or heat treatment in an inert gas atmosphere, are applied, but it is understood that the surface oxide film has already formed during the preceding step for producing pulverized powder. Therefore, a causative substance phase for lowering the coercivity is produced by going through the heat treatment, and thus it becomes difficult to obtain the material exhibiting a high coercivity.

Patent Literature 3 provides an effective method for preventing the coercivity of a Sm—Fe—N-based sintered magnet from being lowered by using an atmosphere from which oxygen is excluded. However, the crystallinity is neither understood nor controlled. Thus, especially when finer pulverization is applied for the purpose of obtaining a higher coercivity, it is understood that the saturation magnetization is notably decreased in return for the higher coercivity.

The object of the present invention is to provide a Sm—Fe—N-based magnet powder, wherein a decrease in saturation magnetization is effectively reduced or prevented, while exhibiting a high coercivity. The further object of the present invention is to provide a Sm—Fe—N-based sintered magnet and a production method therefor, wherein a decrease in saturation magnetization is effectively reduced or prevented, while exhibiting a high coercivity.

According to one aspect of the present invention, a Sm—Fe—N-based magnet powder, comprises a Sm—Fe—N-based magnetic material powder, wherein an average particle size of the Sm—Fe—N-based magnetic material powder is not larger than 5 μm, and a full width at half maximum of a diffraction peak of a (220) plane in an X-ray diffraction profile of the Sm—Fe—N-based magnetic material powder is not larger than 0.0033 Å.

According to another aspect of the present invention, a Sm—Fe—N-based sintered magnet comprises a sintered body of a Sm—Fe—N-based magnetic material, wherein an average grain size of crystal grains of the Sm—Fe—N-based magnetic material is not larger than 5 μm, and a full width at half maximum of a diffraction peak of a (220) plane in an X-ray diffraction profile of the Sm—Fe—N-based magnetic material is not larger than 0.0033 Å.

According to yet another aspect of the present invention, a method for producing a Sm—Fe—N-based sintered magnet comprises pressure-sintering a Sm—Fe—N-based magnetic material powder under an atmosphere of an oxygen concentration not larger than 10 ppm, wherein an average particle size of the Sm—Fe—N-based magnetic material powder is not larger than 5 μm, and a full width at half maximum of a diffraction peak of a (220) plane in an X-ray diffraction profile of the Sm—Fe—N-based magnetic material powder is not larger than 0.0033 Å.

The present invention makes it possible to provide a Sm—Fe—N-based magnet powder, wherein a decrease in saturation magnetization is effectively reduced or prevented, while exhibiting a high coercivity. Further, the present invention makes it possible to provide a Sm—Fe—N-based sintered magnet and a production method therefor, wherein a decrease in saturation magnetization is effectively reduced or prevented, while exhibiting a high coercivity.

BRIEF DESCRIPTION OF THE DRAWINGS

FIG. 3(*b*) shows an enlarged STEM image of a partial region (which contains exemplarily selected one particle and its surroundings) of FIG. 3(*a*), and FIG. 3(*b*) also shows, as insertions, an electron beam diffraction pattern of two regions (a light-contrast part and a dark-contrast part) enclosed with white dotted line. FIG. 3(*c*) shows a STEM image of the Sm—Fe—N-based magnet powder of Example 1. FIG. 3(*d*) shows an enlarged STEM image of a partial region (which contains exemplarily selected one particle and its surroundings) of FIG. 3(*c*).

DETAILED DESCRIPTION OF THE PREFERRED EMBODIMENTS

Figure 1A:
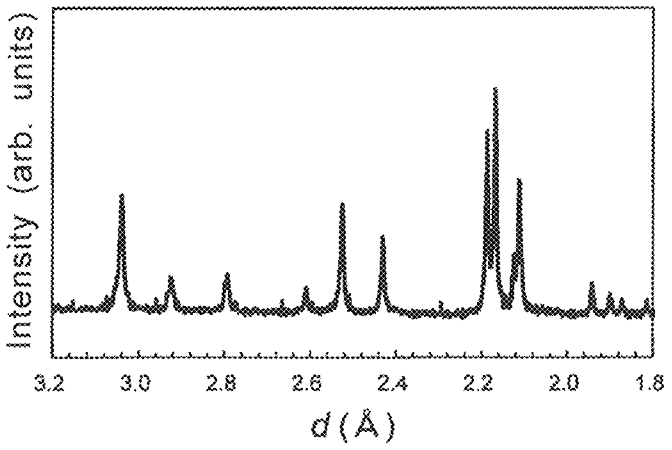
FIGS. 1(*a*) and 1(*b*) are X-ray diffraction profiles of a Sm—Fe—N-based magnet powder of Example 1, wherein FIG. 1(*a*) shows the results in the range of d=3.2 to 1.8 Å, and FIG. 1(*b*) shows an enlarged part containing a diffraction peak of a (220) plane in FIG. 1(*a*).

A Sm—Fe—N-based magnet powder and a Sm—Fe—N-based sintered magnet in embodiments of the present invention will be described below together with their production methods, but the present invention is not limited thereto.

Embodiment 1: Sm—Fe—N-Based Magnet Powder

This embodiment relates to a Sm—Fe—N-based magnet powder and a production method thereof.

A Sm—Fe—N-based magnet powder of this embodiment comprises a Sm—Fe—N-based magnetic material powder, wherein an average particle size of the Sm—Fe—N-based magnetic material powder is not larger than 5 μm, and a full width at half maximum of a diffraction peak of a (220) plane in an X-ray diffraction profile of the Sm—Fe—N-based magnetic material powder is not larger than 0.0033 Å.

In the Sm—Fe—N-based magnet powder, since the average particle size of the Sm—Fe—N-based magnetic material powder is not larger than 5 μm, it becomes possible to obtain a high coercivity. Further, since the full width at half maximum of the diffraction peak of the (220) plane in the X-ray diffraction profile of the Sm—Fe—N-based magnetic material powder is not larger than 0.0033 Å, it becomes possible to effectively reduce or prevent a decrease in saturation magnetization.

The Sm—Fe—N-based magnet powder of this embodiment may substantially consist of the Sm—Fe—N-based magnetic material powder. However, it may comprise other material(s), such as trace element(s) etc. which may be unavoidably incorporated therein.

The Sm—Fe—N-based magnetic material in this embodiment may have any composition composed of Sm, Fe and N, it may representatively have a composition of $Sm_2Fe_{17}N_3$, but not limited thereto.

The average particle size of the Sm—Fe—N-based magnetic material powder is not larger than 5 μm. In order to obtain a high coercivity, the average particle size of the powder is preferably 5 μm or less, and more preferably 3 μm or less. Although the average particle size of the powder is not otherwise limited, it may, for example, be 0.04 μm or more, so that the Sm—Fe—N-based magnetic material can be effectively inhibited from being superparamagnetic, if desired.

The "average particle size" of the powder means a particle size (D50) of a point at which an accumulated value is 50% in a cumulative curve with 100% of the total volume according to a particle size distribution determined on volume basis. The average particle size can be measured by using a laser diffraction/scattering type particle size/particle size distribution measuring apparatus or an scanning electron microscope.

In the X-ray diffraction profile of the Sm—Fe—N-based magnetic material powder, the full width at half maximum of the diffraction peak of the (220) plane can be preferably used as an index of its crystallinity. The smaller the full width at half maximum of the diffraction peak of the (220) plane is (in other words, the sharper the peak is), the higher the crystallinity of the powder is. Since the full width at half maximum of the diffraction peak of the (220) plane is 0.0033 Å or less, it becomes possible to obtain a high crystallinity, and effectively reduce or prevent a decrease in saturation magnetization. The lower limit of the full width at half maximum of the diffraction peak of the (220) plane is not specifically determined, and it may be, for example, 0.0001 Å or more, although it is a value more than zero in theory.

The X-ray diffraction profile of the Sm—Fe—N-based magnetic material powder can be measured by using any appropriate X-ray diffraction apparatus. Then, in the X-ray diffraction profile thus measured, the diffraction peak of the (220) plane is identified based on the composition of the Sm—Fe—N-based magnetic material, and the full width at half maximum of this diffraction peak can be determined.

The full width at half maximum of the diffraction peak can be determined according to a general method known in an X-ray diffraction method. It is noted that an X-ray diffraction profile is generally plotted along with a horizontal axis of 2θ, wherein θ is an incident angle of an X-ray into a surface of a specimen, but an absolute value of θ varies depending on a wavelength λ of a characteristic X-ray which is used. Thus, in the present invention, the horizontal axis is converted into d value by using Bragg equation ($\lambda=2d\times\sin\theta$, wherein d is a spacing between corresponding lattice planes), and the full width at half maximum is determined as a full width at half maximum of the d value. More specifically, any appropriate software can be used to remove a background from the X-ray diffraction profile (converted into d value as explained above), and to remove a sub-peak due to Kα2 ray if the sub-peak due to Kα2 ray may affect the main-peak of Kα1 ray as the characteristic X-ray, and to perform fitting, so that the full width at half maximum of the diffraction peak of the (220) plane can be determined.

It is preferable that an oxygen content ratio of the Sm—Fe—N-based magnetic material powder is not larger than 0.7% by mass. When, for example, the Sm—Fe—N-based magnet powder of this embodiment is used as a raw material for a sintered magnet as explained in Embodiment 2 below, this makes it possible to reduce degradation of a Sm—Fe—N phase (e.g. precipitation of a-Fe due to an oxidation-reduction reaction) during sintering and thus to suppress the decrease in coercivity. The oxygen content ratio in the powder can be measured by inert gas melting-nondispersive infrared absorption method (NDIR) and the like.

The Sm—Fe—N-based magnet powder of this embodiment may be produced by, for example, pulverizing a Sm—Fe—N-based magnet coarse powder under appropriate conditions, and then removing a fine powder from the pulverized powder if necessary.

Conditions of the pulverizing and conditions of the removing if conducted are selected such that the average particle size of the Sm—Fe—N-based magnetic material powder existing finally in the Sm—Fe—N-based magnet powder is not larger than 5 μm, and the full width at half maximum of the diffraction peak of the (220) plane in the X-ray diffraction profile is not larger than 0.0033 Å.

The pulverized powder shows a decreased saturation magnetization depending on the degree of decrease in crystallinity. Therefore, in order to obtain a bulk magnet having high magnetic properties (for example, a sintered magnet as described in Embodiment 2), it is necessary to suppress the decrease in crystallinity. Appropriate selection of the conditions of the pulverization can suppress that the crystallinity of the Sm—Fe—N-based magnetic material is decreased by the pulverization.

The pulverization can be conducted by using a jet mill (of gasflow pulverization type, etc.), a ball mill, or the like, but not limited thereto. Examples of a jet mill of airflow pulverization type may comprise MC44 manufactured by Micro-Macinazione S.A., but not limited thereto.

The pulverization is preferably conducted under an atmosphere of a low oxygen concentration. This makes possible that the powder after the pulverization has a low oxygen content ratio, especially at 0.7% by mass or less. Herein, the atmosphere of a low oxygen concentration means a state where the oxygen concentration (volume basis, the same herein) is 10 ppm or less. For example, an oxygen concentration of 1 ppm or 0.5 ppm and the like can be applied. The pulverization under the atmosphere of a low oxygen concentration can be achieved in a glove box replaced with inert gas (one or mixed gas of two or more from nitrogen, argon, helium, and the like), and preferably in such a glove box connected with a gas circulation type oxygen moisture purifier.

In the powder after the pulverization, a fine powder (which corresponds to a particle fraction having an extremely small particle size in the particle distribution of the powder) tends to be damaged by the pulverization with a higher ratio than that for particles having a larger particle size, and thus shows a lower crystallinity. In order to obtain the pulverized powder with a good crystallinity, it is preferable to remove such a fine powder having the lower crystallinity. The fine powder to be removed may be particles, for example, those having a particle size less than 0.04 μm.

The removal of the fine powder can be conducted by using, for example, an airflow classifier, but not limited thereto.

However, the production method of the Sm—Fe—N-based magnet powder of this embodiment is not limited to those described above, but any appropriate method can be used.

Embodiment 2: Sm—Fe—N-Based Sintered Magnet

This embodiment relates to a Sm—Fe—N-based sintered magnet and a production method thereof. The descriptions in Example 1 are applicable to this embodiment, unless otherwise stated in this embodiment.

A Sm—Fe—N-based sintered magnet of this embodiment comprises a sintered body of a Sm—Fe—N-based magnetic material, wherein an average grain size of crystal grains of the Sm—Fe—N-based magnetic material is not larger than 5 μm, and a full width at half maximum of a diffraction peak of a (220) plane in an X-ray diffraction profile is not larger than 0.0033 Å.

In the Sm—Fe—N-based sintered magnet, since the average grain size of the crystal grains of the Sm—Fe—N-based magnetic material which forms the sintered body is not larger than 5 μm, it becomes possible to obtain a high coercivity. Further, since the full width at half maximum of the diffraction peak of the (220) plane in the X-ray diffraction profile of the sintered body is not larger than 0.0033 Å, it becomes possible to effectively reduce or prevent a decrease in saturation magnetization.

In the present invention, the sintered magnet means a magnet obtained by sintering a magnet powder (or magnetic powder) at a high temperature. The Sm—Fe—N-based sintered magnet of this embodiment may substantially consist of the sintered body of the Sm—Fe—N-based magnetic material. However, it may comprise other material(s), such as trace element(s) which may be unavoidably incorporated therein.

The average grain size of the crystal grains of the Sm—Fe—N-based magnetic material is not larger than 5 μm. In order to obtain a high coercivity, the average grain size of the crystal grains is preferably 5 μm or less, and more preferably 3 μm or less. Although the average grain size of the crystal grains is not otherwise limited, it may, for example, be 0.04 μm or more, so that the Sm—Fe—N-based magnetic material can be effectively inhibited from being superparamagnetic, if desired.

The "average grain size" of the crystal grains is calculated as follows. Firstly, a cross-sectional image of the sintered magnet is photographed by FE-SEM such that the image contains at least 50 crystal grains, and the total area "A" of the cross-sectional areas of the crystal grains and the number "N" of the crystal grains in the thus photographed image are determined. Next, the average cross-sectional area "al" of the crystal grains is determined by "A/N", and the average grain size "d" is calculated as a square root of the average cross-sectional area "al".

Also in the X-ray diffraction profile of the Sm—Fe—N-based sintered magnet (or sintered body), the full width at half maximum of the diffraction peak of the (220) plane can be preferably used as an index of its crystallinity. The smaller the full width at half maximum of the diffraction peak of the (220) plane is (in other words, the sharper the peak is), the higher the crystallinity of the sintered magnet is. Since the full width at half maximum of the diffraction peak of the (220) plane is 0.0033 Å or less, it becomes possible to obtain a high crystallinity, and effectively reduce or prevent a decrease in saturation magnetization. Further, in the case of the sintered magnet of this embodiment, when the full width at half maximum of the diffraction peak of the (220) plane is 0.0026 Å or less, it becomes possible to more effectively reduce or prevent the decrease in saturation magnetization. The lower limit of the full width at half maximum of the diffraction peak of the (220) plane is not specifically determined, and it may be, for example, 0.0001 Å or more, although it is a value more than zero in theory.

The X-ray diffraction profile of the Sm—Fe—N-based sintered magnet can be measured as it is (in the form of a bulk state, without being changed into the form of a powder state) by using any appropriate X-ray diffraction apparatus. The procedures for determining the full width at half maximum of this diffraction peak of the (220) plane from the measured the X-ray diffraction profile are similar to those described in Embodiment 1.

It is preferable that an oxygen content ratio of the Sm—Fe—N-based sintered magnet is not larger than 0.7% by mass. This makes it possible to reduce degradation of a Sm—Fe—N phase (e.g. precipitation of a-Fe due to an oxidation-reduction reaction) during sintering and thus to suppress the decrease in coercivity. The oxygen content ratio in the sintered magnet can also be measured by inert gas melting-nondispersive infrared absorption method (NDIR) and the like.

The Sm—Fe—N-based sintered magnet of this embodiment may be produced by, for example, pressure-sintering the Sm—Fe—N-based magnet powder described in Embodiment 1 under an atmosphere of a low oxygen concentration.

Although it is not necessary in this embodiment, it is preferable to subject the Sm—Fe—N-based magnet powder to orientation and forming (molding) under a magnetic field before the pressure-sintering. This makes an axis of easy magnetization of respective crystal grains is aligned, and it becomes possible to obtain high magnetic properties. The magnetic field to be applied may be static magnetic field of, for example, 2 T or more, and a forming (molding) pressure may be, for example, from 600 MPa to 1.5 GPa, but these are not limited thereto.

Conditions of the pressure-sintering are selected such that the average grain size of the crystal grains of the Sm—Fe—N-based magnetic material existing finally in the Sm—Fe—N-based sintered magnet is not larger than 5 μm, and the full width at half maximum of the diffraction peak of the (220) plane in the X-ray diffraction profile is not larger than 0.0033 Å.

The sintered body shows a decreased saturation magnetization depending on the degree of decrease in crystallinity. Therefore, in order to obtain a bulk magnet having high magnetic properties (the sintered magnet described in this embodiment), it is necessary to suppress the decrease in crystallinity. Appropriate selection of the conditions of the pressure-sintering can suppress that the crystallinity of the Sm—Fe—N-based magnetic material is decreased by the pressure-sintering.

The pressure-sintering is conducted under an atmosphere of a low oxygen concentration. This makes possible that the sintered magnet (or sintered body) after the pressure-sintering has a low oxygen content ratio, especially at 0.7% by mass or less. Herein, the atmosphere of a low oxygen concentration means a state where the oxygen concentration (volume basis) is 10 ppm or less. For example, an oxygen concentration of 1 ppm or 0.5 ppm and the like can be applied. The pressure-sintering under the atmosphere of a low oxygen concentration can be conducted in a vacuum of, for example, 5 Pa (absolute pressure) or less.

For the pressure-sintering, any pressure-sintering methods including electric pressure-sintering can be used. The pressure-sintering may be performed as follows. For example, a magnetic powder is filled in a die, and the die is placed in a pulse electric sintering machine equipped with a pressure control mechanism including a servo control type pressing device without exposing the die to the atmosphere. Then, a constant pressure is applied to the die while a vacuum in the pulse electric sintering machine is maintained, and electric sintering is performed while the pressure is held. The die to be used may have any shape. For example, a cylindrical die may be used without being limited thereto. In the pulse electric sintering machine, a vacuum of 5 Pa (absolute pressure) or less is preferably maintained. The pressure to be applied is higher than normal pressure, and may be any pressure which can form a sintered magnet. The pressure may be, for example, within a range of 100 MPa or more and 2000 MPa or less. The sintering is preferably performed at a temperature of 400° C. or more and 600° C. or less for a time of 30 seconds to 10 minutes.

However, the production method of the Sm—Fe—N-based sintered magnet of this embodiment is not limited to those described above, but any appropriate method can be used.

EXAMPLES

Examples 1 to 11 and Comparative Examples 1 to 6: Sm—Fe—N-based Magnet Powder A Sm—Fe—N-based magnet powder was prepared according to the following procedures.

As a raw material before pulverization, coarse powders A to D having a composition of $Sm_2Fe_{17}N_3$ were used. The coarse powders A to D were taken from different lots, and showed different properties as shown in Table 1. In the table, the average particle size was measured by a laser diffraction particle size distribution measuring apparatus, the oxygen content ratio and the nitrogen content ratio were measured by inert gas melting-nondispersive infrared absorption method (NDIR), and the saturation magnetization and the coercivity were measured by a vibrating sample magnetometer (in following tables, the same properties were measured likewise, unless otherwise stated).

TABLE 1

| Raw material Lot | Average particle size D50 [μm] | Oxygen content ratio [mass %] | Nitrogen content ratio [mass %] | Saturation magnetization [emu/g] | Coercivity [kOe] |
|---|---|---|---|---|---|
| A | 23.7 | 0.12 | 3.5 | 161 | 0.94 |
| B | 22.6 | 0.13 | 3.4 | 160 | 0.67 |
| C | 23.1 | 0.15 | 3.4 | 165 | 0.71 |
| D | 28.8 | 0.14 | 3.5 | 162 | 0.35 |

These coarse powders were pulverized with various conditions shown in Table 2 by using a jet mill of airflow pulverization type. More specifically, in order to adjust the pulverized particle size, a pulverized powder once exited from pulverizing chamber of the jet mill was charged again into the jet mil to repeat the step of pulverization. The number of repeating times (the number of passes) was 1 to 5. In order to prevent the powder from being oxidized, the pulverization was conducted in a grove box. The glove box was connected with a gas circulation type oxygen moisture purifier, and filled with an atmosphere of a low oxygen concentration. After the pulverization, a fine powder (having a particle size less than 0.04 μm) was removed therefrom by using an airflow classifier. Thus, the Sm—Fe—N-based magnet powder was obtained.

TABLE 2

| | Raw material Lot | Pulverizing pressure [MPa] | Number of passes |
|---|---|---|---|
| Example 1 | A | 0.3 | 3 |
| Example 2 | A | 0.3 | 4 |
| Example 3 | A | 0.3 | 5 |
| Example 4 | B | 0.7 | 2 |
| Example 5 | A | 0.9 | 2 |
| Example 6 | B | 0.7 | 3 |
| Example 7 | A | 0.7 | 3 |
| Example 8 | A | 0.8 | 3 |
| Example 9 | A | 0.9 | 2 |
| Example 10 | A | 0.9 | 2 |
| Example 11 | A | 0.7 | 3 |
| Comparative Example 1 | D | 1.5 | 1 |
| Comparative Example 2 | B | 1.0 | 3 |
| Comparative Example 3 | C | 1.5 | 1 |
| Comparative Example 4 | D | 1.5 | 3 |
| Comparative Example 5 | B | 1.0 | 3 |
| Comparative Example 6 | D | 1.5 | 3 |

The properties of the Sm—Fe—N-based magnet powder prepared in Examples 1 to 11 and Comparative Examples 1 to 6 were determined. The results are shown in Table 3. In the table, "FWHM of X-ray diffraction (220) peak" means the full width at half maximum of the diffraction peak of the (220) plane in the X-ray diffraction profile. This was obtained with the use of software HighScore PLUS produced from Malvern Panalytical, by remolding a background and a sub-peak due to Kα2 ray from the X-ray diffraction profile (converted into d value) measured by an X-ray diffraction apparatus (characteristic X-ray: CoKα1=1.789 angstrom), and then performing fitting (in following tables, the same properties were measured likewise, unless otherwise stated). In the table, the saturation magnetization change ratio was calculated on the basis of a saturation magnetization of the raw material coarse powder before the pulverization.

TABLE 3

| | Average particle size D50 [μm] | FWHM of X-ray diffraction (220) peak [Å] | Saturation magnetization [emu/g] | Saturation magnetization change ratio [%] | Coercivity [kOe] |
|---|---|---|---|---|---|
| Example 1 | 4.7 | 0.0016 | 165 | 0.00 | 4.4 |
| Example 2 | 3.3 | 0.0017 | 165 | 0.00 | 5.6 |
| Example 3 | 3.3 | 0.0018 | 160 | −0.49 | 6.7 |
| Example 4 | 3.0 | 0.0024 | 167 | 0.00 | 7.3 |
| Example 5 | 2.7 | 0.0025 | 162 | 0.00 | 8.2 |
| Example 6 | 2.1 | 0.0029 | 163 | −0.56 | 9.5 |
| Example 7 | 2.5 | 0.0029 | 160 | −0.44 | 9.8 |
| Example 8 | 2.4 | 0.0029 | 160 | −0.90 | 9.4 |
| Example 9 | 2.2 | 0.0030 | 161 | 0.00 | 10.2 |
| Example 10 | 2.2 | 0.0032 | 163 | 0.00 | 10.2 |
| Example 11 | 2.0 | 0.0033 | 162 | 0.00 | 10.7 |
| Comparative Example 1 | 1.4 | 0.0034 | 159 | −3.56 | 11.2 |
| Comparative Example 2 | 1.6 | 0.0036 | 160 | −2.33 | 11.8 |
| Comparative Example 3 | 1.2 | 0.0038 | 162 | −1.70 | 12.5 |
| Comparative Example 4 | 1.3 | 0.0039 | 154 | −6.57 | 12.0 |
| Comparative Example 5 | 1.5 | 0.0043 | 162 | −1.26 | 12.4 |
| Comparative Example 6 | 1.2 | 0.0045 | 157 | −4.73 | 12.3 |

Figure 1B:
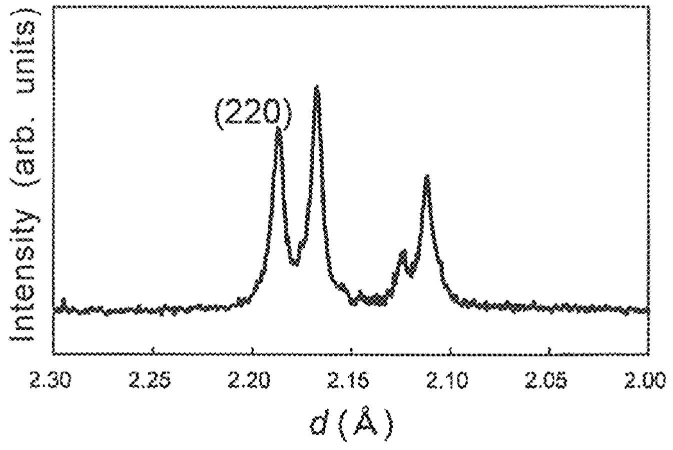
Figure 2A:
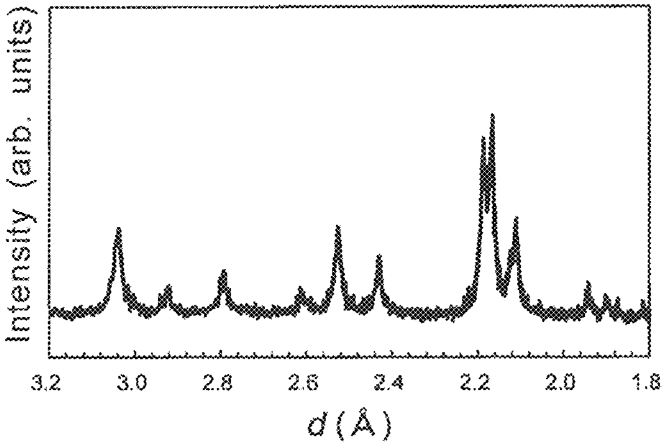
FIGS. 2(*a*) and 2(*b*) are X-ray diffraction profiles of a Sm—Fe—N-based magnet powder of Comparative Example 1, wherein FIG. 2(*a*) shows the results in the range of d=3.2 to 1.8 Å, and FIG. 2(*b*) shows an enlarged part containing a diffraction peak of a (220) plane in FIG. 2(*a*).
Figure 2B:
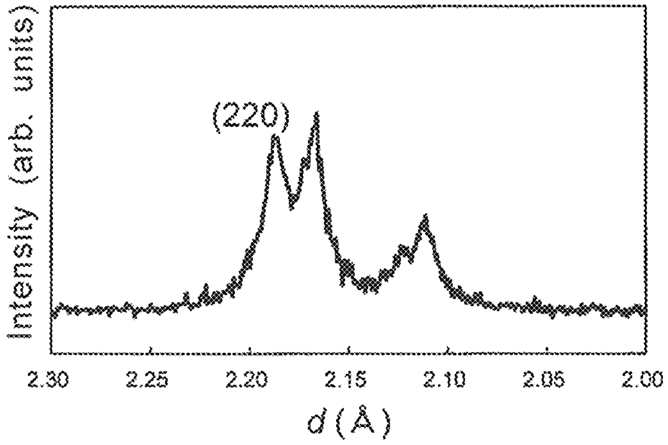

Exemplarily, the X-ray diffraction profiles of the Sm—Fe—N-based magnet powder of Example 1 and Comparative Example 1 measured by the X-ray diffraction apparatus are shown in FIGS. 1 and 2, respectively (characteristic X-ray: CoKα1=1.789 angstrom). It was confirmed that the diffraction peak of the (220) plane of $Sm_2Fe_{17}N_3$ existed around d=2.185 Å.

Figures 3A, 3B, 3C, 3D:
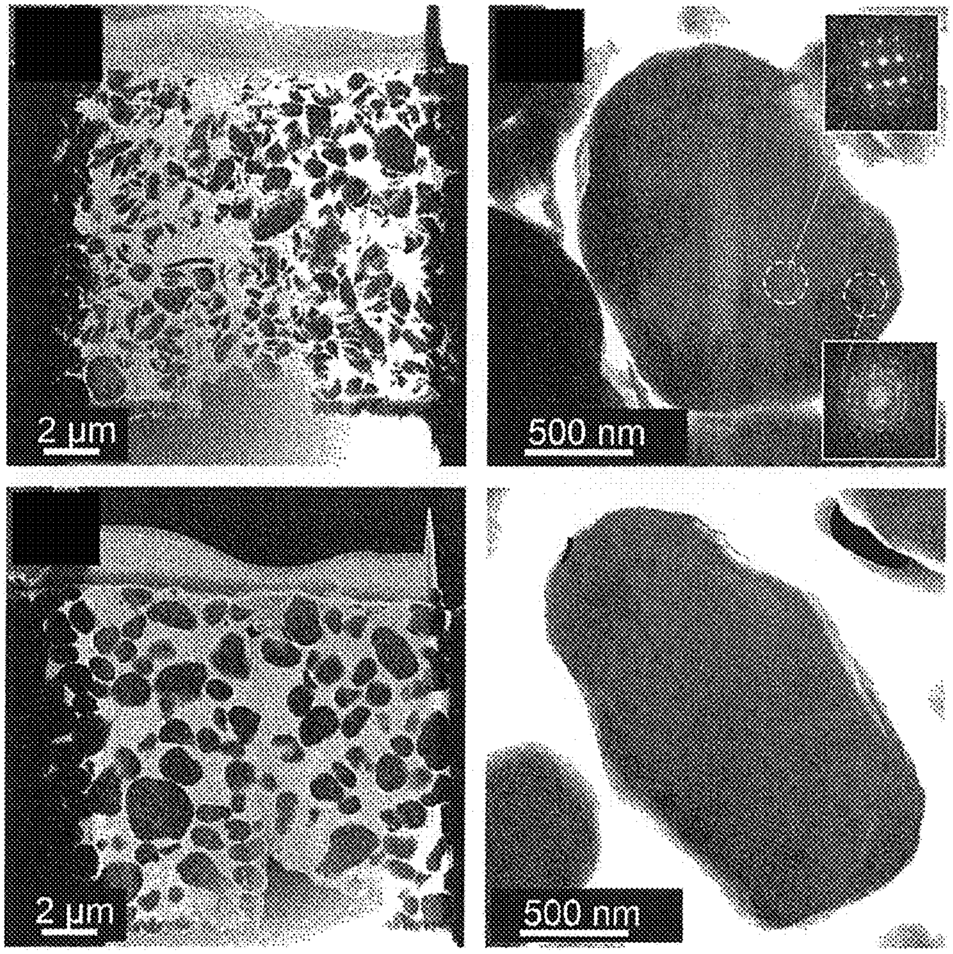
FIG. 3(*a*) shows a STEM image of the Sm—Fe—N-based magnet powder of Comparative Example 1.

Exemplarily, scanning transmission electron microscope (STEM) images and electron beam diffraction patterns of the Sm—Fe—N-based magnet powder of Example 1 and Comparative Example 1 observed by a transmission electron microscope are shown in FIG. 3. Note that samples for the observation were prepared by dispersing the Sm—Fe—N-based magnet powder in a plastic, letting thus obtained object hardened, and slicing the hardened object. In the STEM images, particulate sections shown as relatively dark sections were particles of the magnet powder, and a relatively white section(s) surrounding them was the plastic. In FIG. 3, (a) shows an STEM image of the Sm—Fe—N-based magnet powder of Comparative Example 1; (b) shows an enlarged STEM image of a partial region (which contains exemplarily selected one particle and its surroundings) of (a), and also shows, as insertions, an electron beam diffraction pattern of two regions enclosed with white dotted line (a light-contrast part and a black(dark)-contrast part); (c) shows an STEM image of the Sm—Fe—N-based magnet powder of Example 1; and (d) shows an enlarged STEM image of a partial region (which contains exemplarily selected one particle and its surroundings) of (c). As shown in FIG. 3 (*b*), in the case of Comparative Example 1, most of the peripheral part of the particle were labeled with the black-contrast part. In FIG. 3 (*b*), a midmost part of the particle, shown with the light-contrast part, is understood from its electron beam diffraction pattern (the upper-right insertion in FIG. 3 (*b*)) as having a high crystallinity, while the peripheral part of the particle, shown with the black-contrast part, is understood from its electron beam diffraction pattern (the lower-right insertion in FIG. 3 (*b*)) as having an extremely lowered crystallinity. On the other hand, as shown in FIG. 3 (*d*), the surface part with the low crystallinity of the particle (the black-contrast part) in Example 1 was less than that in the case of Comparative Example 1.

Note that the oxygen content ratio of the Sm—Fe—N-based magnet powder of Examples 1 to 11 and Comparative Examples 1 to 6 was measured by inert gas melting-nondispersive infrared absorption method (NDIR), the results of them were in the range from 0.20 to 0.51% by mass.

As understood from Table 3, as to the Sm—Fe—N-based magnet powder of Examples 1 to 11, the average particle size of the powder was not larger than 5 μm, and the full width at half maximum of the diffraction peak of the (220) plane in the X-ray diffraction profile was not larger than 0.0033 Å, and thereby, it was achieved that the saturation magnetization was kept at an almost unchanged level compared with that of the raw coarse powder before the pulverization, more specifically, a decrease ratio of the saturation magnetization (a negative change ratio) was not larger than 1%, while the high coercivity, more specifically, the coercivity not smaller than 4 kOe was assured. Specifically, the Sm—Fe—N-based magnet powder of Examples 4 to 11, which had the average particle size not larger than 3 μm, attained the much higher coercivity, more specifically, the coercivity not smaller than 7 kOe. On the other hand, as to the Sm—Fe—N-based magnet powder of Comparative Examples 1 to 6, due to its small average particle size, it attained the high coercivity, but the full width at half maximum of the diffraction peak of the (220) plane in the X-ray diffraction profile was larger than 0.0034 Å, and thereby a decrease ratio of the saturation magnetization was large.

Examples 12 to 20 and Comparative Examples 7 to 17: Sm—Fe—N-Based Sintered Magnet A Sm—Fe—N-based sintered magnet was prepared by orienting and forming the Sm—Fe—N-based magnet powder under a magnetic field followed by a heat treatment for sintering, according to the following procedures.

As an raw material for a sintered magnet, the Sm—Fe—N-based magnet powder prepared in the above Examples and Comparative Examples was used as shown in Table 4.

Orienting and Forming Step 0.5 g of the Sm—Fe—N-based magnet powder was weighed in a glove box connected with a gas circulation type oxygen moisture purifier, and filled in a cemented carbide die set having an inner diameter of 5 mm square in cross-section. While applying a static magnetic field of 2 T for orientation, it was pressed with a pressure of 1.2 GPa by hydraulic hand press to produce a compact body.

Sintering Step

The compact body was transferred into a pulse electric sintering machine equipped with a pressurizing mechanism including a servo control type pressing device without being exposed to the atmosphere. Next, while a vacuum of 2 Pa (absolute pressure) or less (wherein substantially no oxygen existed) was maintained in the pulse electric sintering machine, the compact body was pressed with a pressure of 1.2 GPa. While the pressure was maintained, electric sintering was performed at a sintering temperature shown in Table 4 for 1 minute. Thereby, a sintered magnet was obtained.

TABLE 4

| | Sm-Fe-N-based magnet powder | Sintering temperature [° C.] |
|---|---|---|
| Example 12 | Example 1 | 502 |
| Example 13 | Example 2 | 503 |
| Example 14 | Example 3 | 501 |
| Example 15 | Example 4 | 499 |
| Example 16 | Example 9 | 500 |
| Example 17 | Example 4 | 502 |
| Example 18 | Example 6 | 507 |
| Example 19 | Example 7 | 500 |
| Example 20 | Example 10 | 500 |
| Comparative Example 7 | Comparative Example 2 | 507 |
| Comparative Example 8 | Comparative Example 5 | 503 |
| Comparative Example 9 | Comparative Example 3 | 504 |
| Comparative Example 10 | Comparative Example 3 | 402 |
| Comparative Example 11 | Comparative Example 4 | 503 |
| Comparative Example 12 | Comparative Example 1 | 503 |
| Comparative Example 13 | Comparative Example 3 | 501 |
| Comparative Example 14 | Comparative Example 3 | 500 |
| Comparative Example 15 | Comparative Example 6 | 500 |
| Comparative Example 16 | Comparative Example 6 | 301 |
| Comparative Example 17 | Comparative Example 6 | 402 |

The properties of the Sm—Fe—N-based sintered magnet prepared in Examples 12 to 20 and Comparative Examples 7 to 17 were determined. The results are shown in Table 5. In the table, the oxygen content ratio was measured by inert gas melting-nondispersive infrared absorption method (NDIR). In the table, the saturation magnetization change ratio was calculated on the basis of the saturation magnetization of the raw material coarse powder before the pulverization.

TABLE 5

| | FWHM of X-ray diffraction (220) peak [Å] | Oxygen content ratio [mass %] | Saturation magnetization [emu/g] | Saturation magnetization change ratio [%] | Coercivity [kOe] | Average grain size [μm] |
|---|---|---|---|---|---|---|
| Example 12 | 0.0023 | 0.37 | 158 | −2.15 | 4.1 | 4.7 |
| Example 13 | 0.0024 | 0.44 | 156 | −2.89 | 5.0 | 3.3 |
| Example 14 | 0.0026 | 0.40 | 156 | −2.92 | 5.6 | 3.3 |
| Example 15 | 0.0031 | 0.23 | 159 | −3.05 | 5.4 | 3.0 |
| Example 16 | 0.0031 | 0.27 | 154 | −4.12 | 7.9 | 2.2 |
| Example 17 | 0.0031 | 0.23 | 158 | −3.26 | 5.9 | 3.0 |
| Example 18 | 0.0032 | 0.27 | 157 | −3.98 | 7.2 | 2.1 |
| Example 19 | 0.0033 | 0.35 | 155 | −3.86 | 7.9 | 2.5 |
| Example 20 | 0.0033 | 0.34 | 153 | −4.99 | 8.9 | 2.2 |
| Comparative Example 7 | 0.0035 | 0.34 | 154 | −6.07 | 10.5 | 1.6 |
| Comparative Example 8 | 0.0037 | 0.37 | 151 | −7.40 | 11.2 | 2.7 |
| Comparative Example 9 | 0.0039 | 0.84 | 154 | −6.84 | 11.8 | 1.5 |
| Comparative Example 10 | 0.0040 | 1.06 | 155 | −6.09 | 12.4 | 1.2 |
| Comparative Example 11 | 0.0040 | 0.62 | 150 | −8.91 | 10.6 | 1.2 |
| Comparative Example 12 | 0.0041 | 0.72 | 152 | −7.73 | 10.2 | 1.3 |
| Comparative Example 13 | 0.0041 | 0.75 | 154 | −6.41 | 11.0 | 1.4 |
| Comparative Example 14 | 0.0042 | 0.66 | 153 | −7.32 | 11.6 | 1.2 |

TABLE 5-continued

| | FWHM of X-ray diffraction (220) peak [Å] | Oxygen content ratio [mass %] | Saturation magnetization [emu/g] | Saturation magnetization change ratio [%] | Coercivity [kOe] | Average grain size [μm] |
|---|---|---|---|---|---|---|
| Comparative Example 15 | 0.0045 | 0.64 | 148 | −9.90 | 11.8 | 1.2 |
| Comparative Example 16 | 0.0045 | 1.14 | 146 | −11.19 | 13.0 | 1.2 |
| Comparative Example 17 | 0.0049 | 1.14 | 148 | −9.95 | 12.6 | 1.2 |

Figure 4A:
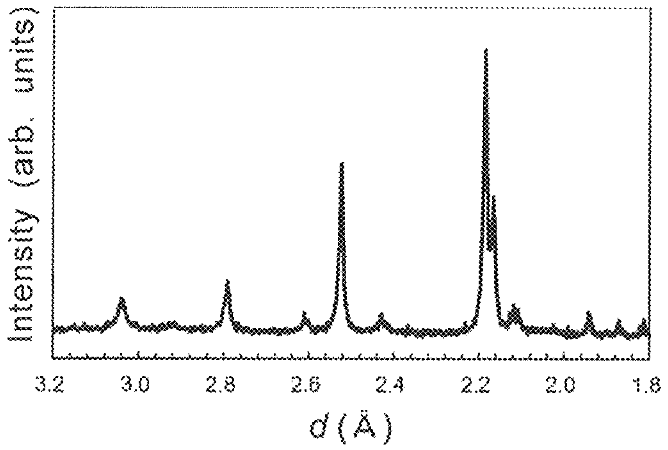
FIGS. 4(*a*) and 4(*b*) are X-ray diffraction profiles of a Sm—Fe—N-based sintered magnet of Example 12, wherein FIG. 4(*a*) shows the results in the range of d=3.2 to 1.8 Å, and FIG. 4(*b*) shows an enlarged part containing a diffraction peak of a (220) plane in FIG. 4(*a*).
Figure 4B:
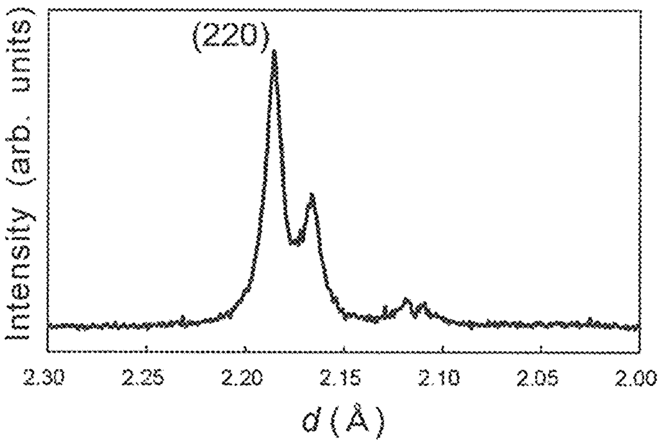
Figure 5A:
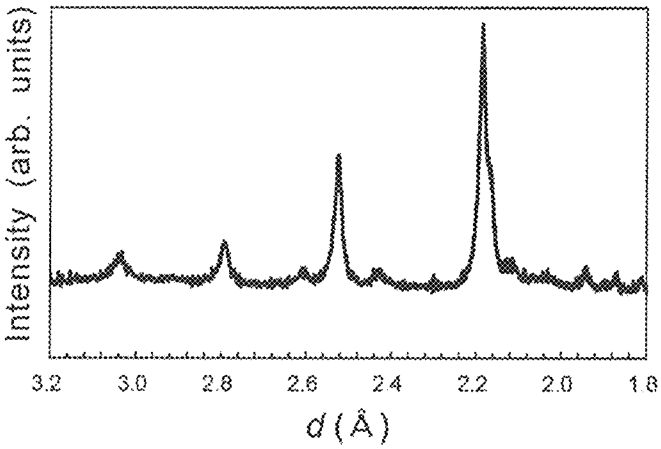
FIGS. 5(*a*) and 5(*b*) are X-ray diffraction profiles of a Sm—Fe—N-based sintered magnet of Comparative Example 12, wherein FIG. 5(*a*) shows the results in the range of d=3.2 to 1.8 Å, and FIG. 5(*b*) shows an enlarged part containing a diffraction peak of a (220) plane in FIG. 5(*a*).
Figure 5B:
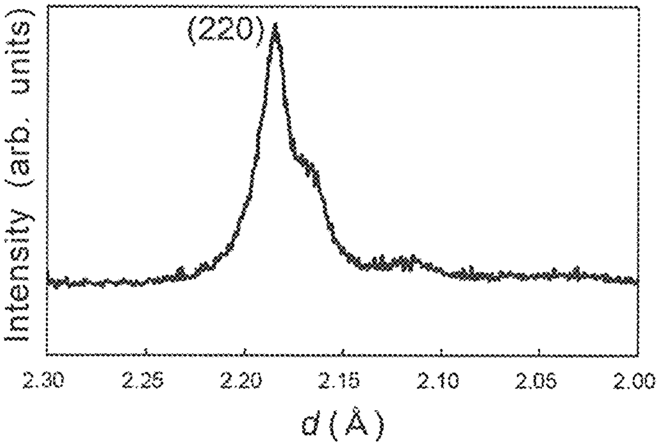

Exemplarily, the X-ray diffraction profiles of the Sm—Fe—N-based sintered magnet of Example 12 and Comparative Example 12 measured by the X-ray diffraction apparatus are shown in FIGS. 4 and 5, respectively (characteristic X-ray: CoKα1=1.789 angstrom). It was confirmed that the diffraction peak of the (220) plane of $Sm_2Fe_{17}N_3$ existed around d=2.185 Å.

Figure 6:
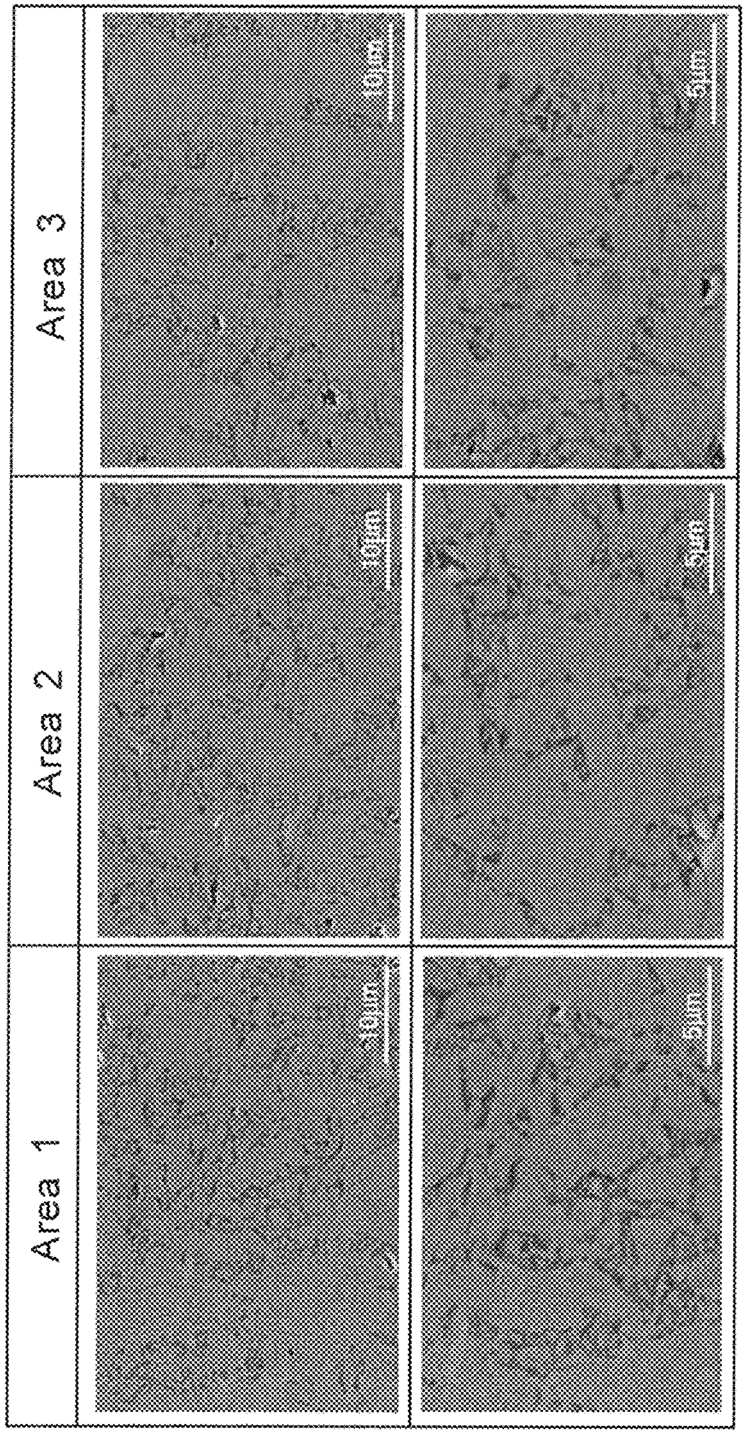
FIG. 6 shows a SEM image of three different areas in a cross section of the Sm—Fe—N-based sintered magnet of Example 12 with different scale factor between upper and lower rows.
Figure 7:
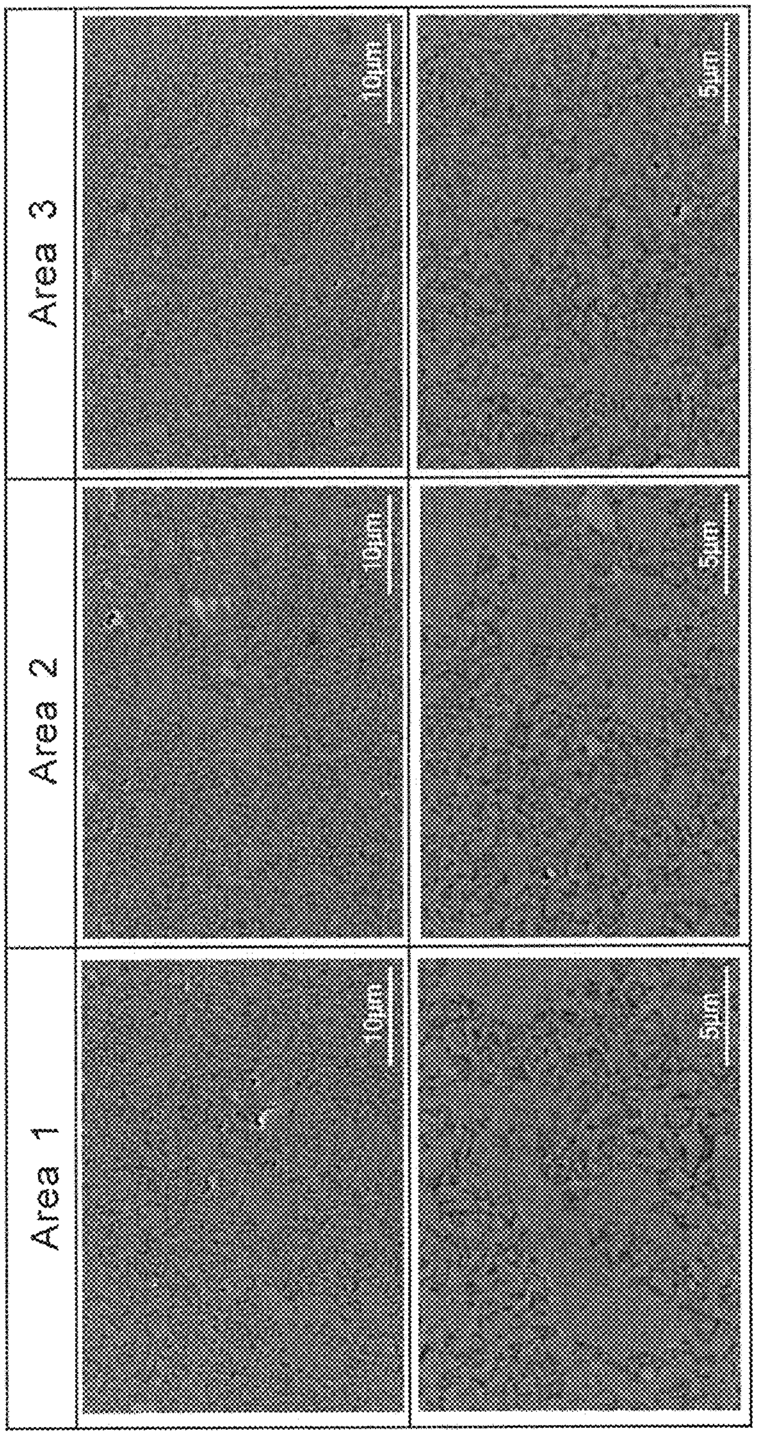
FIG. 7 shows a SEM image of three different areas in a cross section of the Sm—Fe—N-based sintered magnet of Comparative Example 12 with different scale factor between upper and lower rows.

Also exemplarily, SEM images in a cross section of the Sm—Fe—N-based sintered magnet of Example 12 and Comparative Example 12 are shown in FIGS. 6 and 7, respectively. In FIGS. 6 and 7, the SEM images of three different areas 1 to 3 are shown with different scale factor between upper and lower rows. In these SEM images, sections shown with light gray color were crystal grains of the Sm—Fe—N-based magnetic material, and sections shown with black or dark gray color ware voids. In all of the SEM images, although it would be difficult to see a border of the grains in some cases since the crystal grains would be combined with each other by sintering, a size of the crystal grains were generally in the range from 0.01 μm to 10 μm, and the average grain size was not larger than 5 μm. Note that, as to the Sm—Fe—N-based sintered magnet of other Examples 13 to 20 and Comparative Examples 7 to 11 and 13 to 17, it was confirmed from their SEM images that the average grain size was not larger than 5 μm.

As understood from Table 5 and the results of observation of the SEM images, as to the Sm—Fe—N-based sintered magnet of Examples 12 to 20, the average grain size of the crystal grains was not larger than 5 μm, and the full width at half maximum of the diffraction peak of the (220) plane in the X-ray diffraction profile was not larger than 0.0033 Å, and thereby, it was achieved that the saturation magnetization was kept at an almost unchanged level compared with that of the raw coarse powder before the pulverization, more specifically, a decrease ratio of the saturation magnetization (a negative change ratio) was not larger than 5%, while the high coercivity, more specifically, the coercivity not smaller than 4 kOe was assured. Specifically, the Sm—Fe—N-based sintered magnet of Examples 12 to 14, which had the full width at half maximum of the diffraction peak of the (220) plane in the X-ray diffraction profile not larger than 0.0026 Å, attained the decrease ratio of the saturation magnetization (the negative change ratio) not larger than 3%. On the other hand, as to the Sm—Fe—N-based sintered magnet of Comparative Examples 7 to 17, it attained the high coercivity, but the full width at half maximum of the diffraction peak of the (220) plane in the X-ray diffraction profile was larger than 0.0035 Å, and thereby a decrease ratio of the saturation magnetization was large.

The Sm—Fe—N-based magnet powder and the sintered magnet of the present invention can be used in a wide range of applications in the field of various motors. For example, the magnet powder and the sintered magnet can be used for an in-car auxiliary motor and EV (Electric Vehicle)/HEV (Hybrid Electric Vehicle) main machine motor and the like. More specifically, the magnet powder and the sintered magnet can be used for an oil pump motor, an electric power steering motor, and an EV/HEV drive motor and the like.

The invention claimed is:

1. A Sm—Fe—N-based magnet powder, comprising:

a Sm—Fe—N-based magnetic material powder, wherein an average particle size of the Sm—Fe—N-based magnetic material powder is not larger than 5 μm, the particle size of the Sm—Fe—N-based magnetic material powder is 0.04 μm or more, and a full width at half maximum of a diffraction peak of a (220) plane in an X-ray diffraction profile of the Sm—Fe—N-based magnetic material powder is not larger than 0.0033 Å.

2. The Sm—Fe—N-based magnet powder according to claim 1, wherein the average particle size of the Sm—Fe—N-based magnetic material powder is not larger than 3 μm.

3. The Sm—Fe—N-based magnet powder according to claim 1, wherein the Sm—Fe—N-based magnetic powder is $Sm_2Fe_{17}N_3$.

4. The Sm—Fe—N-based magnet powder according to claim 1, wherein the full width at half maximum of the diffraction peak of the (220) plane in the X-ray diffraction profile of the Sm—Fe—N-based magnetic material powder is 0.0001 Å to 0.0033 Å.

5. The Sm—Fe—N-based magnet powder according to claim 1, wherein the Sm—Fe—N-based magnetic material powder has an oxygen content ratio of not larger than 0.7% by mass.

6. A Sm—Fe—N-based sintered magnet, comprising:

a sintered body of a Sm—Fe—N-based magnetic material, wherein an average grain size of crystal grains of the Sm—Fe—N-based magnetic material is not larger than 5 μm, the grain size of the crystal grains of the Sm—Fe—N-based magnetic material powder is 0.04 μm or more, and a full width at half maximum of a diffraction peak of a (220) plane in an X-ray diffraction profile of the Sm—Fe—N-based magnetic material is not larger than 0.0033 Å.

7. The Sm—Fe—N-based sintered magnet according to claim 6, wherein the full width at half maximum of the diffraction peak of the (220) plane in the X-ray diffraction profile of the Sm—Fe—N-based magnetic material is not larger than 0.0026 Å.

8. The Sm—Fe—N-based sintered magnet according to claim 6, wherein an oxygen content ratio of the Sm—Fe—N-based magnetic material is not larger than 0.7% by mass.

9. The Sm—Fe—N-based sintered magnet according to claim 6, wherein the average particle size of the Sm—Fe—N-based magnetic material is not larger than 3 μm.

10. A method for producing a Sm—Fe—N-based sintered magnet, the method comprising:

pressure-sintering a Sm—Fe—N-based magnetic material powder under an atmosphere of an oxygen concentration not larger than 10 ppm, wherein an average particle size of the Sm—Fe—N-based magnetic material powder is not larger than 5 μm, the particle size of the Sm—Fe—N-based magnetic material powder is 0.04 μm or more, and a full width at half maximum of a diffraction peak of a (220) plane in an X-ray diffraction profile of the Sm—Fe—N-based magnetic material powder is not larger than 0.0033 Å.

11. The method for producing the Sm—Fe—N-based sintered magnet according to claim 10, further comprising subjecting the Sm—Fe—N-based magnetic material powder to a magnetic field before the pressure-sintering.

12. The method for producing the Sm—Fe—N-based sintered magnet according to claim 11, wherein the magnetic field is a static magnetic field of 2 T or more.

13. The method for producing the Sm—Fe—N-based sintered magnet according to claim 10, wherein a pressure of the pressure-sintering is 600 MPa to 1.5 GPa.

14. The method for producing the Sm—Fe—N-based sintered magnet according to claim 10, wherein a temperature of the pressure-sintering is 400° C. to 600° C.

15. The method for producing the Sm—Fe—N-based sintered magnet according to claim 14, wherein a time of the pressure-sintering is 30 seconds to 10 minutes.

16. The method for producing the Sm—Fe—N-based sintered magnet according to claim 10, wherein the average particle size of the Sm—Fe—N-based magnetic material powder is not larger than 3 μm.

* * * * *